United States Patent [19]
Carre et al.

[11] Patent Number: 5,993,910
[45] Date of Patent: Nov. 30, 1999

[54] MATERIAL FOR IMPARTING NON-STICK AND NON-WETTING PROPERTIES

[75] Inventors: Alain Carre, Le Chatelet en Brie; Michel Prassas, Vulaines sur Seine; Jean Waku-Nsimba, Fontainebleau, all of France

[73] Assignee: Corning Incorporated, Corning, N.Y.

[21] Appl. No.: 09/029,300

[22] PCT Filed: Sep. 17, 1996

[86] PCT No.: PCT/US96/14908

§ 371 Date: Mar. 4, 1998

§ 102(e) Date: Mar. 4, 1998

[87] PCT Pub. No.: WO97/11992

PCT Pub. Date: Apr. 13, 1997

Related U.S. Application Data

[60] Provisional application No. 60/007,704, Nov. 29, 1995.

[30] Foreign Application Priority Data

Sep. 28, 1995 [FR] France .................................. 95 11373

[51] Int. Cl.$^6$ ....................................................... B05D 3/02
[52] U.S. Cl. .......................... 427/387; 428/447; 524/430; 524/431; 524/437; 524/783; 524/786; 524/837
[58] Field of Search ..................................... 524/430, 431, 524/437, 783, 786, 837; 427/387; 428/447

[56] References Cited

U.S. PATENT DOCUMENTS

| | | | |
|---|---|---|---|
| 4,275,118 | 6/1981 | Baney et al. | 428/412 |
| 4,311,738 | 1/1982 | Chi | 524/783 |
| 4,439,239 | 3/1984 | Greigger et al. | 106/287.16 |
| 5,102,695 | 4/1992 | Guest et al. | 524/267 |

FOREIGN PATENT DOCUMENTS

| | | |
|---|---|---|
| 0 339 257 | 3/1989 | European Pat. Off. . |
| 0 401 736 | 6/1990 | European Pat. Off. . |
| 2 384 009 | 3/1978 | France . |
| 2 718 143 | 3/1994 | France . |

*Primary Examiner*—Melvyn I. Marquis
*Attorney, Agent, or Firm*—Milton M. Peterson; Anca C. Gheorghiu

[57] ABSTRACT

A material system and method for imparting non-stick and non-wetting properties to an inorganic article having hydroxyl groups on its surface, the system comprising a silane having the formula $R_nSiX_{4-n}$, wherein n is 1–2 and X is a hydrolyzable group, a colloidal metal oxide sol, and an acidified aqueous mixture with a lower alkanol.

11 Claims, No Drawings

MATERIAL FOR IMPARTING NON-STICK AND NON-WETTING PROPERTIES

RELATED APPLICATION

An application entitled SYSTEMS FOR IMPARTING NON-STICK AND NON-WETTING PROPERTIES TO SURFACES, filed under Ser. No. 60/007,705 in the names of A. Carré, M. Prassas and J. Waku and assigned to the same assignee as this application, is directed to a material system and method for imparting non-stick and non-wetting properties to an inorganic article having hydroxyl groups on its surface, the system comprising a silane having the formula $R_nMX_{4-n}$ wherein n is 1 or 2 and X is a hydrolyzable group, a metal alkoxide having at least three hydrolyzable branches and a formula $RMX_3$ or $MX_4$ wherein M is a metal and X is a hydrolyzable branch, and an acidified aqueous mixture with a lower alkanol.

The present application claims the benefit of French Application 95 11373, filed Sep. 28, 1995 (28-09-1995), and of U.S. Provisional Application No. 60/007,704, express mailed Nov. 29, 1995, entitled SYSTEMS FOR IMPARTING NON-STICK AND NON-WETTING PROPERTIES TO SURFACES, by A. Carré, M. Prassas and J. Waku.

FIELD OF THE INVENTION

The field is a material system and a process for coating articles, particularly glass and glass-ceramic articles, to impart durable, non-stick and non-wetting properties.

BACKGROUND OF THE INVENTION

Considerable effort has been directed at producing an effective, non-stick and non-wetting coating on the surface of an inorganic article, in particular a utensil for preparing and/or serving food. The term "non-stick" signifies a surface that resists adherence of foreign substances, such as food. This property permits easy cleaning of dishes in which foods are cooked or baked. The term "non-wetting" indicates a surface that repels liquids such as water. The property is evidenced by a large contact angle between a drop of water and the surface on which the drop rests. An advancing angle of at least 90° is considered as representative of a non-wettable surface.

Non-stick, non-wetting articles are commonly produced by coating article surfaces with a polytetrafluoroethylene (PTFE) layer. For example, U.S. Pat. No. 4,683,168 (Hares et al.) describes a process for coating glass or glass-ceramic articles with such a layer to produce non-stick cooking utensils. However, PTFE coatings exhibit the disadvantage of being opaque. Also, they require a thermal sintering process at 350°–400° C. for their production, are relatively expensive to produce, and do not provide a desired degree of abrasion resistance.

French Patent No. 2,674,862 (Carré) discloses an alternative material system and process for producing durable, non-stick and water repellent coatings on glass and glass-ceramic surfaces. The process involves applying a mixture of a selected silane with a lower alkanol and water which may be acidified. The silane has the formula $R_nSiX_{4-n}$, where R is an alkyl radical and X is a hydrolyzable alkoxy or chloro group. The mixture is applied to a surface containing hydroxyl groups, the silane is hydrolyzed and the alkanol-water mixture eliminated to form a polysiloxane coating adhering to the surface.

Numerous other processes and material systems have been proposed for rendering inorganic surfaces, particularly vitreous surfaces, non-sticking and water repellent. The desired properties can be obtained initially. However, there has persisted a problem with respect to wear during use, in particular, scratching by cleaning agents. It is, then, a purpose of the present invention to improve on the Carré process by imparting a greater abrasion resistance to the coating there disclosed.

SUMMARY OF THE INVENTION

The present invention resides in part in a material system for imparting non-stick and non-wetting properties to an inorganic article having hydroxyl groups on its surface, the system comprising a silane having the formula $R_nSiX_{4-n}$ wherein n is 1–2 and X is a hydrolyzable group, a colloidal metal oxide sol, and an acidified aqueous mixture with a lower alkanol.

The invention further resides in a method of imparting non-stick and non-wetting properties to an inorganic article having hydroxyl groups on its surface which comprises mixing a colloidal metal oxide sol with a silane having a formula $R_nSiX_{4-n}$, wherein n is 1–2 and X is a hydrolyzable group, and an acidified aqueous mixture of a lower alkanol, applying a coating of the mixture to a surface on the inorganic article, and thermally processing the coating at a temperature of at least 100° C. to form a solid, transparent film on the article surface.

DESCRIPTION OF THE INVENTION

The present invention arose from studies directed at improving the polysiloxane, non-stick coating disclosed in French Patent No. 2,674,862 (Carré). The non-stick properties of the Carré coating are adequate. However the coating, like other known non-stick coatings, is prone to damage and removal. This is particularly true when the coating is subjected to the abrasion occasioned by normal scrubbing. Accordingly, efforts were directed at improving the abrasion-resistance of the known coating while either retaining, or improving on, its non-stick characteristics.

We have now discovered a material system that produces a coating exhibiting an exceptionally high contact angle. The coating also provides substantially improved abrasion resistance while retaining the good non-stick characteristics of the prior polysiloxane coating. The new material system is achieved by incorporating a colloidal metal sol with the prior silane component to achieve a hybrid coating material.

The new hybrid coating material, like the earlier silane coating material, is effective when applied to an inorganic article having hydroxyl groups on its surface, in particular, a glass or glass-ceramic article. The silane is hydrolyzed to produce hydroxyl groups. These groups, produced during hydrolysis, link with the hydroxyl groups on the article surface to create a surface exhibiting hydrophobic properties.

The coating material represents a mixture of at least three components: (a) a silane having the formula $R_nSiX_{4-n}$, (b) a colloidal metal oxide sol, and (c) a mixture of a lower alkanol and acidified water.

In the silane formula $R_nSiX_{4-n}$, each R is chosen independently from among the methyl, ethyl, and propyl radicals, unsubstituted or partially or totally substituted by fluorine atoms; X is a hydrolyzable group chosen from among the methoxy, ethoxy, and chloro groups; n=1 or 2. A mixture of a lower alkanol and water is added to the silane constituent as a solvent. The water is preferably acidified, at least where X is a methoxy or ethoxy group.

Among the usable silanes encompassed within the above formula, it is preferred that R be a non-substituted lower alkyl radical, the methyl group being the most preferred. The non-substituted silanes are preferred from a practical point of view. They are more economical than silanes containing fluorinated radicals.

The silane component can be formed exclusively of a silane having the above formula where n=1 or 2. It may also be a mixture of silanes having the above formula where n=2 and where n=1. In a mixture, the silane having the above formula where n=2 preferably constitutes at least 20 mole percent of the silane mixture. The most preferred silane of the above formula where n=2 is dimethyldiethoxysilane. The most preferred silane of the above formula where n=1 is methyltriethoxysilane.

The alkanol employed in the alkanol-water mixture can be a lower alkanol such as methanol, ethanol, or a propanol such as isopropanol. Ethanol or propanol is preferred, the choice depending on the method of application. The role of the alkanol is simply to permit the solution and/or the dispersion of the silane in the aqueous mixture, the silane not being soluble in water.

Where a non-chlorinated silane constituent is used, the alkanol-water mixture can conveniently contain 5–93% by volume water. In contrast, where a chlorinated silane component is employed, the proportion of water in the alkanol-water mixture can be reduced to a very small amount, i.e., to the order of trace amounts.

The water is acidified with a mineral or organic acid, for example, to reduce the pH below approximately 4 where an alkoxylated silane constituent is used. Examples of operable acids include hydrochloric acid, nitric acid, sulfuric acid, and acetic acid. When a chlorinated silane constituent is utilized, it is not always necessary to pre-acidify the water. It is acidified automatically as soon as the silane hydrolysis commences as a result of the formation of HCl.

The proportion of silane in the composition is not very critical. For example, it may be about 0.06–1 mole/liter, preferably about 0.1–0.6 mole/liter, of the mixture.

The colloidal metal oxide sol is preferably prepared from a metal oxide selected from the group composed of silica, titania, zirconia and alumina. In preparing the material system for use, the colloidal sol is added to the silane. The mixture is continuously stirred during addition of the sol and for a period of time thereafter while the silane undergoes hydrolysis. With completion of the hydrolysis, the alcohol and acid are successively added with stirring. The mixture is then aged for at least 24 hours while stirring is continued.

The coating material is now applied to the surface to be protected. The hydrolyzed X groups on the silane can react by condensation with the hydroxyl groups present at an inorganic surface to form stable bonds with that surface. The overall result of these reactions is the formation of a thin, hybrid coating. This coating is durably bonded to the surface of the treated inorganic article, and confers non-stick and water repellent properties to that surface. The inventive compositions for treating inorganic surfaces exhibit limited stability and, therefore, must be used within a reasonably short time of their preparation (<5 days).

The reaction of the hydrolyzed groups with the hydroxyl groups on an inorganic surface can be carried out at ambient temperature. However, that reaction is rather slow (about 24 hours). The time required may be substantially shortened by a heat treatment, for example, at 80° C.

To complete densification, the coated article may be heated to a temperature of about 100°–400° C. for a period of time. This can be, for example, about 5–30 minutes, depending upon the particular composition used for the treatment and upon the temperature of heating.

One method of forming the protective coating is to dip the article to be treated into a bath of the inventive composition for a few seconds while the article is at an elevated temperature, e.g., 100°–300° C. The article is then permitted to cool naturally. The evaporation of the alkanol-water mixture and the condensation reactions take place during that cooling.

This mode of forming the desired coating is especially economical and convenient in operation for glass and glass-ceramic articles. The manufacturing of such articles customarily involves heating processes, e.g., in forming the article, or in annealing, tempering, ceramming, or other form of thermal treatment. With such articles, the inventive process can be implemented in a production line. The article will be at a temperature sufficiently high to be suitable for carrying out the thermal treatment necessary for the formation of the coating.

Other methods of forming the protective coating involve painting, spinning, or spraying the coating material onto an unheated surface. The material is then heated at 100–300° C. for 5–30 minutes to remove volatiles and set the coating.

The coating obtained from the inventive compositions imparts improved abrasion resistance, as well as water repellent properties, to the coated surface. These properties are surprisingly superior to those that can be obtained from prior compositions based upon silanes alone. In particular, the present coatings are much more resistant to detrimental effects from abrasives and detergents.

The nature of the protective coating, and its production, may be seen in the following projected formulations:

a. A glass or glass-ceramic surface containing hydroxyl groups;

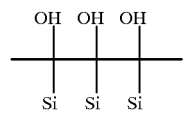

b. Hydrolysis of a hydrolyzable silane

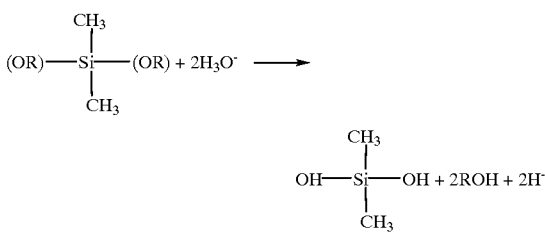

The hydroxyl groups produced by hydrolysis in (b) link with those on the article surface (a) to form a hydrophobic coating, thus imparting hydrophobic properties to the surface.

SPECIFIC EMBODIMENTS

Several material systems were prepared employing the preferred silane diethoxydimethyl silane (DEDMS), a colloidal sol, ethanol and 12 M hydrochloric acid. Each system was prepared as described above. The liquid mixture was applied to a vitreous test piece by spinning, and thermally processed at about 120° C. to set the coating on the surface.

Subsequently, the water repellent properties were determined by measuring the advancing and receding contact angles of a drop of water.

EXAMPLE 1

(1) DEDMS: 3 g
* (2) Colloidal Silica: 15 cc
(3) Ethanol: 85 cc
(4) HCl: 1 cc

Results

Water advancing contact angle: 133°
Water receding contact angle: 69°

EXAMPLE 2

(1) DEDMS: 3 g
* (2) Colloidal Silica: 15 cc
(3) Ethanol: 85 cc
(4) HCl: 5 cc

Results

Water advancing contact angle: 163°
Water receding contact angle: 92°

* The colloidal silica was composed of about 40% by weight silica in water, the silica particle size being about 14 nm.

EXAMPLE 3

(1) DEDMS: 3 g
* (2) Colloidal titania: 10 cc
(3) Ethanol: 85 cc
(4) HCl: 15 cc

Results

Water advancing contact angle: 102°
Water receding contact angle: 67°

EXAMPLE 4

(1) DEDMS: 3 g
* (2) Colloidal titania: 10 cc
(3) Ethanol: 85 cc
(4) 15 M $HNO_3$: 15 cc Results Water advancing contact angle: 98°
Water receding contact angle: 70°

* The colloidal titania was composed of about 15.6% by weight titania in water, the titania particle size being about 5 nm.

EXAMPLE 5

(1) DEDMS: 3 g
* (2) Colloidal zirconia: 10 cc
(3) Ethanol: 85 cc
(4) HCl: 15 cc Results Water advancing contact angle: 103°
Water receding contact angle: 69°

EXAMPLE 6

(1) DEDMS: 3 g
* (2) Colloidal zirconia: 0.34 cc
(3) Ethanol: 85 cc
(4) HCl 15 cc Results Water advancing contact angle: 102°
Water receding contact angle: 72°

* The colloidal zirconia was composed of about 30.1% by weight zirconia in water, the zirconia particle size being about 70 nm.

We claim:

1. A material system for imparting improved abrasion resistance, non-stick and non-wetting properties to an inorganic article having hydroxyl groups on its surface, the material system comprising the following components:
    (a) a silane having the formula $R_nSiX_{4-n}$, wherein
        each R is chosen independently from the group consisting of methyl radical, ethyl radical, or propyl radical, unsubstituted or partially or totally substituted by fluorine atoms;
        X is a hydrolyzable group chosen from the group consisting of methoxy, ethoxy and chloro groups; and,
        n=1 or 2;
    (b) a colloidal metal oxide sol selected from the group consisting of silica, titania, zirconia and alumina, and
    (c) an acidified aqueous mixture with a lower alkanol.

2. A material system in accordance with claim 1 wherein the silane is diethoxydimethyl silane.

3. A material system in accordance with claim 1 wherein the colloidal metal oxide is silica.

4. A material system in accordance with claim 1 wherein the inorganic article is a glass or a glass-ceramic article.

5. A material system in accordance with claim 1 wherein the lower alkanol is ethanol.

6. A method of imparting non-stick and non-wetting properties to an inorganic article having hydroxyl groups on its surface, the method comprising the following steps:
    (1) mixing a colloidal metal oxide sol selected from the group consisting of silica, titania, zirconia and alumina, with an acidified aqueous mixture of a lower alkanol and a silane having a formula $R_nSiX_{4-n}$, wherein
        each R is chosen independently from the group consisting of methyl radical, ethyl radical, or propyl radical, unsubstituted or partially or totally substituted by fluorine atoms;
        X is a hydrolyzable group chosen from the group consisting of methoxy, ethoxy and chloro groups; and,
        n=1 or 2;
    (2) applying a coating of the mixture to a surface of an inorganic article; and,
    (3) thermally heating the coating at a temperature of at least 100° C. to form a solid, transparent film on the inorganic article surface.

7. A method in accordance with claim 6 which comprises applying the mixture by dipping a heated article in the mixture.

8. A method in accordance with claim 6 which comprises thermally heating the coating at a temperature of 100–300° C.

9. A protective coating for an inorganic article comprising the hydrolyzed product of a silane having a formula $R_nSiX_{4-}$ $n$, wherein each R is chosen independently from the group consisting of methyl radical, ethyl radical, or propyl radical, unsubstituted or partially or totally substituted by fluorine atoms, X is a hydrolyzable group chosen from the group consisting of methoxy, ethoxy and chloro groups, and n=1 or 2, and dispersed therein colloidal metal oxide particles selected from the group consisting of silica, titania, zirconia and alumina.

10. A polysiloxane film consisting essentially of the hydrolyzed product of a silane having a formula $R_nSiX_{4-n}$, wherein each R is chosen independently from the group consisting of methyl radical, ethyl radical, or propyl radical, unsubstituted or partially or totally substituted by fluorine atoms, X is a hydrolyzable group chosen from the group consisting of methoxy, ethoxy and chloro groups, and n=1 or 2, and a colloidal metal oxide selected from the group consisting of silica, titania, zirconia and alumina.

11. A coating material in accordance with claim 1 with the conditions that (i) where n=2 the silane component is comprised of at least 20 mole percent of a silane having the above formula, and (ii) the water is acidified at least in the cases where X is a methoxy or ethoxy group.

\* \* \* \* \*